United States Patent
Yamamori et al.

(10) Patent No.: US 7,303,045 B2
(45) Date of Patent: Dec. 4, 2007

(54) MOTOR VEHICLE STEERING DEVICE

(75) Inventors: Motoyasu Yamamori, Nagoya (JP);
Osamu Watanabe, Okazaki (JP);
Susumu Honaga, Hoi-gun (JP);
Yoshiharu Inaguma, Kariya (JP)

(73) Assignee: Jtekt Corporation (JP)

( * ) Notice: Subject to any disclaimer, the term of this patent is extended or adjusted under 35 U.S.C. 154(b) by 97 days.

(21) Appl. No.: 11/082,157

(22) Filed: Mar. 16, 2005

(65) Prior Publication Data

US 2005/0155812 A1 Jul. 21, 2005

Related U.S. Application Data

(62) Division of application No. 10/775,924, filed on Feb. 9, 2004, now Pat. No. 6,938,724.

(30) Foreign Application Priority Data

Mar. 18, 2003 (JP) .............................. 2003-073953

(51) Int. Cl.
*B62D 5/04* (2006.01)
(52) U.S. Cl. ................... 180/444; 74/388 PS
(58) Field of Classification Search ................ 180/421, 180/446, 444; 74/388 PS
See application file for complete search history.

(56) References Cited

U.S. PATENT DOCUMENTS

| | | | |
|---|---|---|---|
| 3,172,299 | A | 3/1965 | United Shoe Machinery Corporation |
| 4,932,492 | A * | 6/1990 | Sauvageot et al. ........... 180/446 |
| 5,423,391 | A * | 6/1995 | Shimizu ..................... 180/446 |
| 5,482,130 | A * | 1/1996 | Shimizu ..................... 180/447 |
| 5,517,899 | A | 5/1996 | Bohner et al. |
| 6,012,347 | A | 1/2000 | Hasegawa et al. |
| 6,155,377 | A * | 12/2000 | Tokunaga et al. ........... 180/446 |
| 6,164,150 | A * | 12/2000 | Shindo et al. ............ 74/388 PS |
| 6,179,083 | B1 | 1/2001 | Yamauchi |
| 6,273,211 | B1 | 8/2001 | Engels et al. |
| 6,367,577 | B2 * | 4/2002 | Murata et al. .............. 180/446 |
| 6,374,693 | B1 * | 4/2002 | Kawabe et al. ................ 74/499 |
| 6,386,313 | B1 * | 5/2002 | Choi .......................... 180/447 |

(Continued)

FOREIGN PATENT DOCUMENTS

DE 4330338 9/1994

(Continued)

OTHER PUBLICATIONS

European Search Report, European Patent Application No. 04003043.9 dated Mar. 2, 2005.

(Continued)

*Primary Examiner*—Tony Winner
(74) *Attorney, Agent, or Firm*—Darby & Darby PC

(57) ABSTRACT

A compact and highly reliable motor vehicle steering device that does not require a spiral flat cable. The motor vehicle steering device includes variable gear ratio system that modifies the transmission ratio of the rotary motions between first steering shaft and second steering shaft. Variable gear ratio system comprises Strain Wave Gearing Speed Reducer that modifies the transmission ratio between first steering shaft and second steering shaft in response to the rotating speed of motor shaft. Motor shaft and second steering shaft forms a substantially concentric dual structure, drive motor is affixed, and output shaft is connected to motor shaft.

9 Claims, 11 Drawing Sheets

U.S. PATENT DOCUMENTS

| | | | |
|---|---|---|---|
| 6,470,994 B1 * | 10/2002 | Shimizu et al. | 180/446 |
| 6,547,031 B1 * | 4/2003 | Magnus | 180/444 |
| 2002/0096388 A1 | 7/2002 | Fujiwara et al. | |

FOREIGN PATENT DOCUMENTS

| | | |
|---|---|---|
| DE | 19748667 | 5/1998 |
| DE | 19852447 | 6/1999 |
| DE | 19906703 | 8/2000 |
| DE | 101 59 700 A1 | 11/2002 |
| EP | 0189172 | 7/1986 |
| EP | 0548854 | 6/1993 |
| JP | 2000-127985 | 5/2000 |
| JP | 2002-021948 | 1/2002 |
| JP | 2002-240729 | 8/2002 |

OTHER PUBLICATIONS

Patent Abstract of Germany for DE-101 59 700 A 1 published on Nov. 28, 2002.

* cited by examiner

PRIOR ART

PRIOR ART

MOTOR VEHICLE STEERING DEVICE

INCORPORATION BY REFERENCE

This application is a divisional of U.S. patent application Ser. No. 10/775,924 filed Feb. 9, 2004 now U.S. Pat. No. 6,938,724 claims priority under 35 U.S.C. §119 to Japanese Patent Application No. 2003-073953 filed on Mar. 18, 2003. The content of that application is incorporated herein by reference, in its entirety.

FIELD OF THE INVENTION

The invention relates to a motor vehicle steering device that transmits the steering angle from the steering handle to the turning ring.

DESCRIPTION OF THE RELATED ART

A conventional steering device transmits the steering angle of the steering wheel to the turning ring at an approximately constant transmission ratio to provide a specified turning angle. For example, in a motor vehicle steering device of a conventional rack and pinion type, the transmission ratio between the steering angle and the turning angle is determined by the mesh between the pinion gear that rotates with the steering wheel as a unit and the rack gear connected with the turning ring through a turning rod.

However, when the transmission ratio of the motor vehicle steering device is constant, it is difficult to achieve proper operating feelings both when driving at low speeds and when driving at high speeds. In other words, it is desirable to set up a high transmission ratio, i.e., providing a high turning angle by a small steering angle, for driving at low speeds. On the contrary, it is desirable to have a low transmission ratio between the steering angle and the turning angle when driving at high speeds in order to secure safe and stable driving conditions.

Therefore, various types of motor vehicle steering device having variable gear ratio systems have been proposed for providing variable transmission ratios between the steering angle and the turning angle depending on driving conditions.

One of such variable gear ratio systems is constituted based on a speed reducer whose reduction ratio is modified by means of a rotary input provided by an external source. For such a speed reducer, a planetary gearing reducer or a Strain Wave Gearing Speed Reducer is used. For example, see Laid Open Japanese Patent Application 2000-232041 ("JP '041"), specifically paragraphs 0013 through 0017, and FIGS. 2 and 3.

A conventional steering device 9 using a Strain Wave Gearing Speed Reducer will be described in the following referring to FIG. 9. This motor vehicle steering device is so constituted as to transmit the operator's operation on steering wheel 910 to a gearbox 970 via a steering shaft 920, intermediate shafts 930 and 940, and distal end shaft 960, all of which are connected by universal joints 921 and 951. A gearbox 970 converts the rotary motion of distal end shaft 960 into a linear motion in the axial direction of a turning rod 980.

A variable gear ratio system 950 is provided between intermediate shaft 930 and intermediate shaft 940 for modifying the transmission ratio between those shafts.

This variable gear ratio system 950 is constituted in such a way as to change the transmission ratio between intermediate shaft 930 and intermediate shaft 940 by means of a Strain Wave Gearing Speed Reducer 90 as shown in FIG. 10. The operating principle of Strain Wave Gearing Speed Reducer 90 is as follows:

Strain Wave Gearing Speed Reducer 90 is a reducer comprising a Circular Spline 91, a Flexspline 93, and a Wave Generator 92 as shown in FIG. 10. Strain Wave Gearing Speed Reducer 90 is constituted is such a way that the transmission ratio between Circular Spline 91 and Flexspline 93 is modified by means of the rotation of Wave Generator 92.

Internal to variable gear ratio system 950, Circular Spline 91 is connected to intermediate shaft 930 that rotates together with steering wheel 910 (FIG. 9), and Flexspline 93 is connected to intermediate shaft 940 that rotates together with distal end shaft 960. An output shaft 952 of a drive motor 951 installed inside of a housing 965 that rotates together with intermediate shaft 940 is inserted into Wave Generator 92.

Drive motor 951 comprises a stator 953 affixed to the inner diameter of housing 965, a rotor 954 provided inside said stator 953, and an output shaft 952 that provides the output rotation of said rotor 954. It is so constituted that the transmission ratio between Circular Spline 91 and Flexspline 93 varies when Wave Generator 92 that rotates together with output shaft 952 rotates. In other words, variable gear ratio system 950 is so constituted as to modify the transmission ratio between intermediate shaft 930 and intermediate shaft 940 by means of drive motor 951.

However, motor vehicle steering device 9 of the prior art has the following problems. As noted, drive motor 951 is affixed to the inside of housing 965 that rotates together with intermediated intermediate shaft 940. Drive motor 951 needs to be connected with lead wires for power supply, lead wires for transmitting control signals, etc.

Therefore, it is necessary for those multiple lead wires to be able to accommodate the rotation of drive motor 951 in accordance with the rotation of said intermediate shaft 940. Consequently, in case of this variable gear ratio system 950, a flat cable 957 is used on which the multiple lead wires are laid out as shown in FIG. 11. This flat cable 957 is wound in a spiral fashion around the outer circumference of an insertion part 967 to which intermediate shaft 940 is inserted in housing 965.

A cover 958 is provided on the outer circumference of insertion part 967 as shown in FIG. 11 in order to protect flat cable 957 wrapped around in the spiral fashion. Cover 958 is affixed to the vehicle body (not shown) so that it would not be affected by the rotary motion of intermediate shaft 940 and housing 965.

Each lead wire of flat cable 957 is connected electrically to input/output terminal 959 provided on the outside of cover 958. This makes it possible for drive motor 951 to be controlled by external equipment such as ECU via these input/output terminals 959.

In variable gear ratio system 950, flat cable 957 is installed in the spiral fashion as shown in FIG. 11 inside of affixed cover 958. It is so constituted that the diametrical shrinkage of this flat cable 957 allows it to absorb the relative rotation between cover 958 and intermediate shaft 940 that rotates in the direction of winding up flat cable 957. Therefore, it was necessary to provide a sufficient length of flat cable 957 considering a case where intermediate shaft 940 rotates all the way in the direction of winding up flat cable 957.

When intermediate shaft 940 rotates in the direction of further loosening flat cable 957, on the contrary, the spiral of flat cable 957 expands in the diametrical direction. Therefore, it was necessary to provide a sufficient diameter of the case 958 considering a case where intermediate shaft 940 rotates all the way in the direction of loosening up flat cable 957.

Moreover, it was necessary for said cover 958 to have a sufficient axial length as shown in FIG. 10 in order to accommodate the width of flat cable 957, which is widened to include the necessary number of lead wires arranged in parallel with each other.

Thus, in variable gear ratio system 950 of the prior art, it was necessary to provide a large space to contain long flat cable 957 connected to drive motor 951 as shown in FIG. 10.

Moreover, the spiral of flat cable 957 cyclically repeats expansion and shrinkage as intermediate shaft 940 rotates. As a consequence, it was necessary to pay attention to the flexibility of lead wires and the wear resistance of the coating of the lead wires to prevent deteriorations due to the metal fatigue of flat cable 957 and the abrasion between different parts of flat cable 957.

Thus, there are various problems that may arise from the structure itself when a spiral flat cable is used. Consequently, the development of a motor vehicle steering device with a simpler structure that does not require said spiral flat cable has been desired.

The present invention is thus made to solve such problems of the prior art device and provide a motor vehicle steering device having a compact and reliable highly variable gear ratio system without using a spiral flat cable.

SUMMARY OF THE INVENTION

The invention is a motor vehicle steering device including a variable transmission ratio mechanism that varies a rotational movement transmission ratio between a first steering shaft that rotates with a steering wheel as a unit and a second steering shaft connected to a turning rod for turning a turning ring. The variable transmission ratio mechanism having a drive motor, a motor shaft for transmitting rotation of said drive motor's output shaft; and a speed reducer constituted to be able to modify the transmission ratio between a rotation input entered by said first steering shaft and a rotation output emitted to said second steering shaft. The motor shaft and second steering shaft constitute a substantially concentric dual structure. The drive motor is fixedly installed in such a way so as not to be affected either by said first steering shaft or said second steering shaft with said output shaft is connected to said motor shaft.

In the motor vehicle steering device of the present embodiment, said drive motor is affixed so that it would not be affected by the rotation of either said first steering shaft or said second steering shaft. A motor shaft is arranged in a substantially concentric relation with said second steering shaft in a dual structure on the inside or outside of it, and the rotation of said drive motor is delivered to said speed reducer via this motor shaft.

Therefore, the drive motor itself does not rotate in conjunction of the rotations of the first steering shaft and the second steering shaft in this motor vehicle steering device.

Therefore, it is not necessary at all to connect a spiral flat cable to the drive motor. Thus, it is possible to solve associated with the spiral flat cable and provide a more compact and reliable structure.

An embodiment is a motor vehicle steering device having a variable transmission ratio mechanism that varies a rotational movement transmission ratio between a first steering shaft that rotates with a steering wheel as a unit and a second steering shaft connected to a turning rod for turning a turning ring. The variable transmission ratio mechanism has a drive motor; a motor shaft for transmitting rotation of said drive motor's output shaft; and a speed reducer constituted in such a way as to be able to modify the transmission ratio between a rotation input entered by said first steering shaft and a rotation output emitted to said second steering shaft. The motor shaft and said first steering shaft constitute a substantially concentric dual structure. Also, the drive motor is fixedly installed in such a way so as not to be affected either by said first steering shaft or said second steering shaft with said output shaft is connected to said motor shaft.

In the motor vehicle steering device of the present embodiment, said drive motor is affixed so that it would not be affected by the rotation of either said first steering shaft or said second steering shaft. A motor shaft is arranged in a substantially concentric relation with said first steering shaft in a dual structure on the inside or outside of it, and the rotation of said drive motor is delivered to said speed reducer via this motor shaft.

Therefore, the drive motor itself does not rotate in conjunction of the rotations of the first steering shaft or the second steering shaft in this motor vehicle steering device.

Therefore, it is not necessary at all to connect a spiral flat cable to the drive motor. Thus, it is possible to solve associated with the spiral flat cable and provide a more compact and reliable structure.

DESCRIPTION OF KEYS

Figure 1:
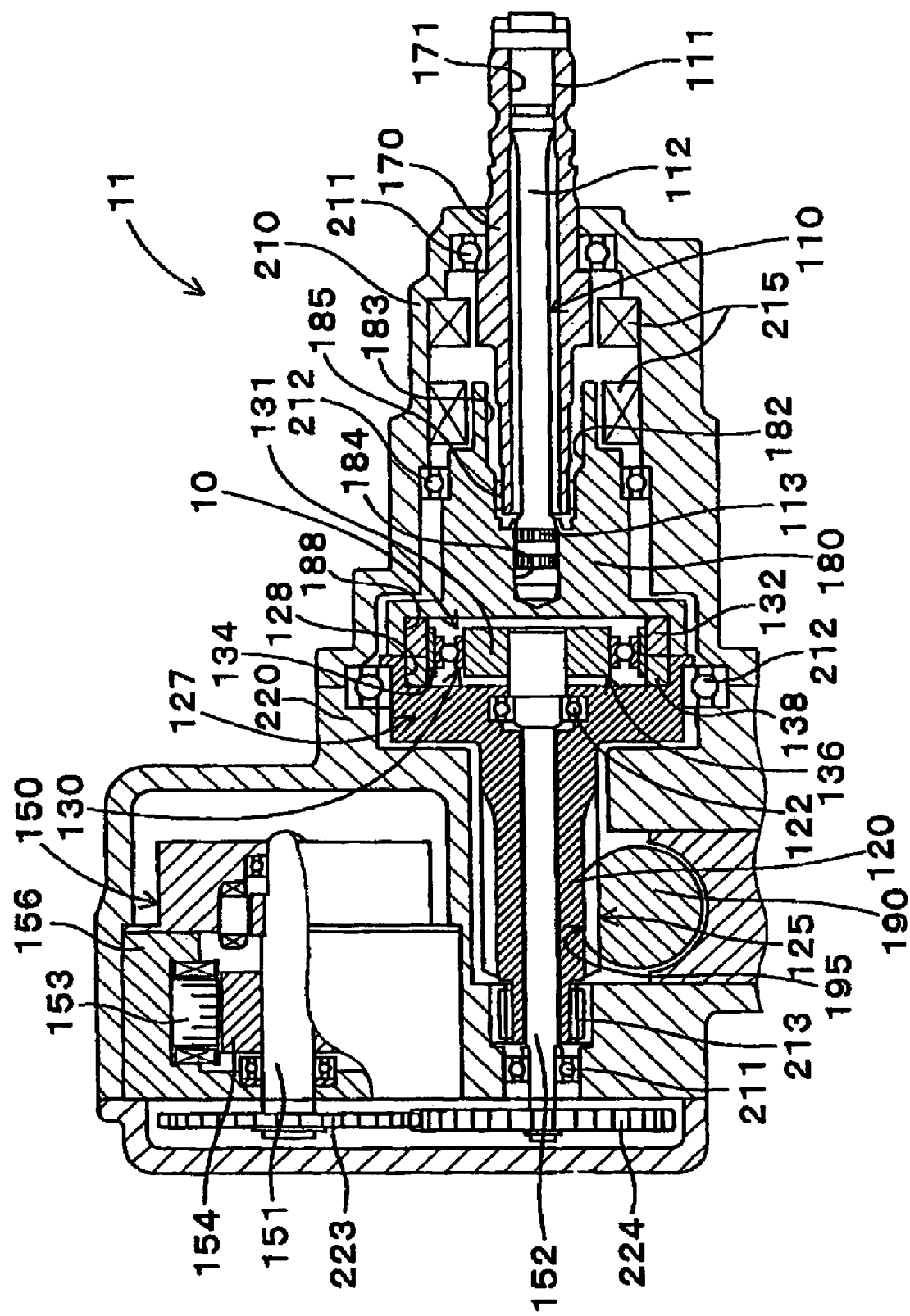
FIG. 1 is a cross section showing a gearbox containing a variable gear ratio system of the present invention.
Figure 2:
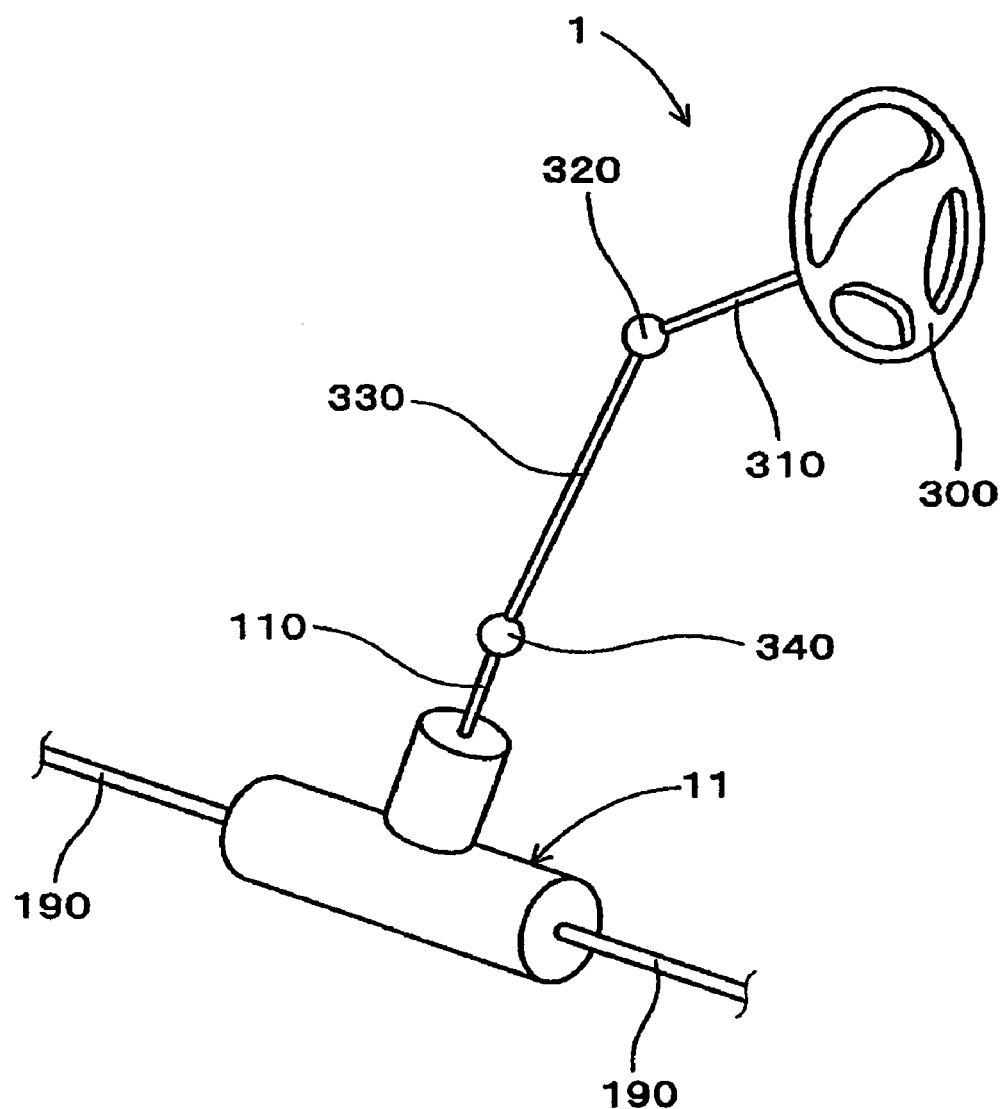
FIG. 2 is a descriptive drawing showing the structure of a motor vehicle steering device of the present invention.

1 motor vehicle steering device
10 variable gear ratio system
11 steering gear box
110 first steering shaft
118 rotary valve
120 second steering shaft
150 drive motor
151 output shaft
152 motor shaft
190 turning rod
210 shaft housing
220 gear housing 280 transmission shaft
29 servo valve
291 supply port
292 discharge port
293, 294 supply/discharge port
295 sleeve valve
300 steering wheel

DETAILED DESCRIPTION OF THE PREFERRED EMBODIMENT

A motor vehicle steering device of an embodiment will be described below referring to FIG. 1 through FIG. 4.

The embodiment relates to a motor vehicle steering device 1 shown in FIG. 1 comprising a variable gear ratio system 10 that varies the rotary motion transmission ratio between a first steering shaft 110 that rotates together with a steering wheel 300 (FIG. 2) and a second steering shaft 120 connected to a turning rod 190 provided for turning a turning ring (not shown).

Said variable gear ratio system 10 comprises a drive motor 150, a motor shaft 152 for transmitting the rotation of an output shaft 151 of said drive motor 150, and a Strain Wave Gearing Speed Reducer 130.

Strain Wave Gearing Speed Reducer 130 is so constituted as to change the transmission ratio between the input rotary speed from first steering shaft 110 and the output rotary speed transmitted to second steering shaft 120 depending on the rotary speed of motor shaft 152.

Motor shaft 152 and second steering shaft 120 form a substantially concentric dual structure, and drive motor 150 is installed in a affixed condition so as not to receive any effect from the rotation of either first steering shaft 110 or second steering shaft 120 with its output shaft 151 connected to motor shaft 152.

Further detailed descriptions about this arrangement are as follows.

Motor vehicle steering device 1 comprises a steering wheel 300, a steering gearbox 11 containing a variable gear ratio system 10 (FIG. 1), and a turning ring (not shown). The rotation of a steering shaft 310, which is built integral with steering wheel 300, is transmitted to a first steering shaft 110 inserted into steering gearbox 11 via universal joints 320 and 340, an intermediate shaft 330 provided between two universal joints 320 and 340.

Figure 3:
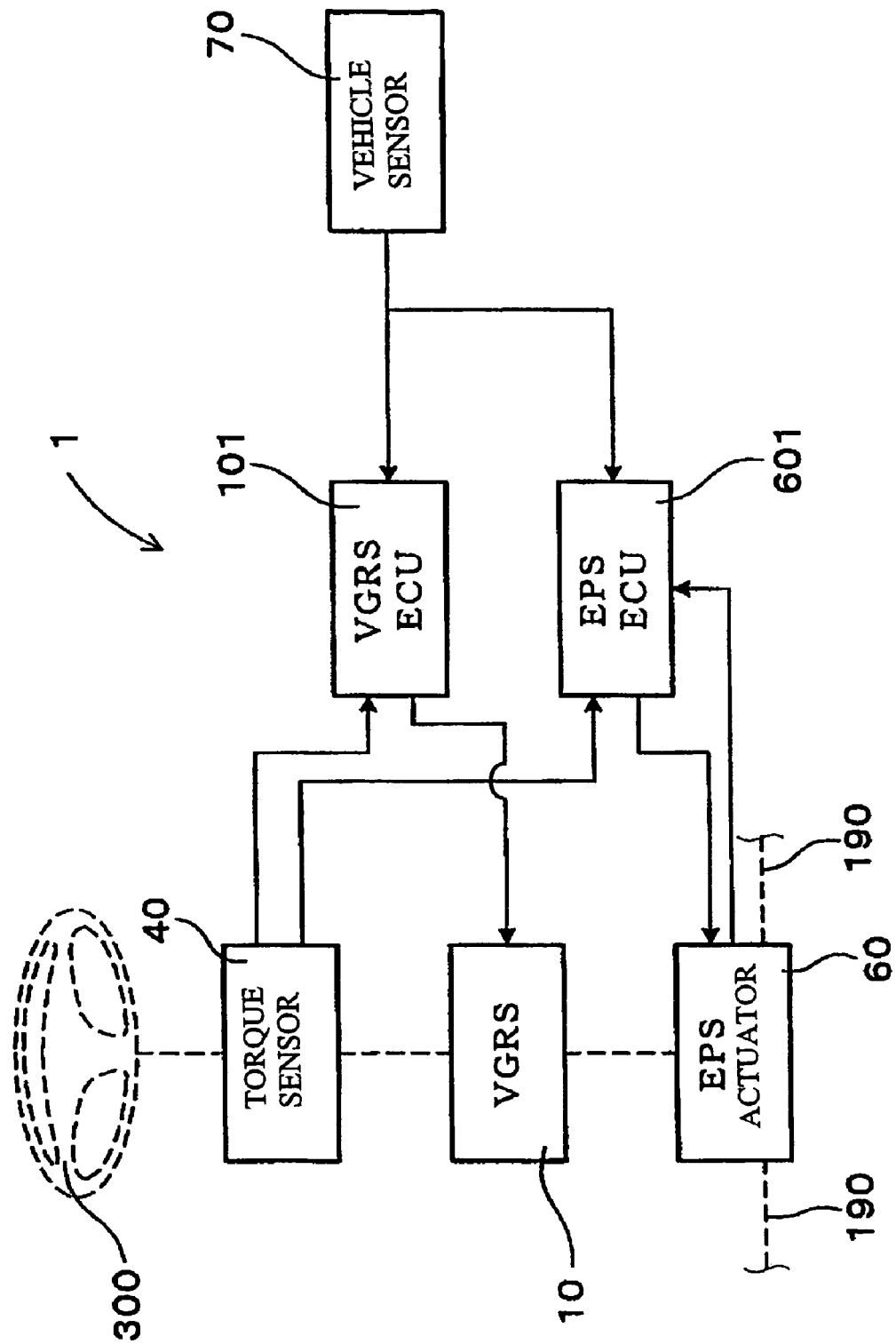
FIG. 3 is a block diagram showing the structure of the motor vehicle steering device of the present invention.

Motor vehicle steering device 1 of this embodiment is based on an electric power steering device with an EPS actuator 60 built into steering gearbox 11 as shown in FIG. 3. Motor vehicle steering device 1 of this embodiment based on said electric power steering device is constituted to be able to reduce the operating force on steering handle 300 with the help of EPS actuator 60. It is also possible to reduce the operating force on steering handle 300 with a hydraulic power assist by means of incorporating a hydraulic actuator in place of said EPS actuator 60.

Motor vehicle steering device 1 of this embodiment is constituted in such a way that EPS actuator 60 and variable gear ratio system (VGRS) 10 are controlled by a first ECU (EPS ECU) 601 that controls EPS actuator 60 and a second ECU (VGRS ECU) 101 that controls VGRS 10 as shown in FIG. 3. It is so constituted that the vehicle speed signal from a vehicle speed sensor 70, the rotating torque provided by torque sensor 40 and the steering angle of steering wheel 300 are entered into first ECU 601 and second ECU 101 as input values, so that the system can be controlled in accordance with steering conditions such as vehicle speed, and steering wheel torque.

First ECU 601 is constituted in such a way as to control EPS actuator 60 in accordance with the rotating torque provided by steering wheel 300 to first steering shaft 110 and vehicle speed signal provided by vehicle speed sensor 70 as shown in FIG. 3. Second ECU 101 is constituted to control variable gear ratio system 10 in accordance with the input of the steering angle of steering handle 300 and the vehicle speed.

As shown in FIG. 1, which shows a cross section that contains the rotating axis of first steering shaft 110 and is perpendicular to turning rod 190, steering gearbox 11 is a rack and pinion type gearbox. Steering gearbox 11 contains turning rod 190 that goes though it as well as first steering shaft 110 that enters the gearbox from a direction that is substantially perpendicular to said turning rod 190.

Steering gearbox 11 is so constituted that the rotary motion of first steering shaft 110 can be converted into a linear motion in the axial direction of turning rod 190 as shown in FIG. 1. On each end of this turning rod 190 is provided a turning ring (not shown), so that the turning angle of the turning ring can be modified by means of the axial linear motion of turning rod 190.

Steering gearbox 11 contains variable gear ratio system 10 that includes Strain Wave Gearing Speed Reducer 130 as shown in FIG. 1. This variable gear ratio system 10 is constituted to receive an input rotary motion from first steering shaft 110 and sends out the rotary motion of second steering shaft 120 provided coaxially with said first steering shaft 110 as its output.

Additionally that the transmission ratio between first steering shaft 110 and second steering shaft 120 can be modified by means of the rotation of drive motor 150 affixed in steering gearbox 11.

Steering gearbox 11 consists of a shaft housing 210 containing the distal end of first steering shaft 110, and a gear housing 220 containing said turning rod 190 and second steering shaft 120 as shown in FIG. 1

Shaft housing 210 containing first steering shaft 110 forms a cylindrical shape with a hollow through structure. A spool 170 that forms an approximately cylindrical shape for concentrically holding first steering shaft 110 and a flange 180 that engages with the spline teeth at the distal end of first steering shaft 110 are rotatably supported by bearings 211 and 212 installed on the inner circumference of shaft housing 210.

Flange 180 is a member of an approximately cylindrical shape whose cross section is substantially circular as shown in FIG. 1. At its end on the first steering shaft 110 side is located a cavity 182 whose cross section is substantially circular and concentric with first steering shaft 110 and spool 170. This cavity 182 comprises a first cavity 183 for housing spool 170 and a cavity 184, which is smaller in diameter than first cavity 183, for housing first steering shaft 110 that protrudes from spool 170.

In the inner circumference of this first cavity 183 is provided, as shown in FIG. 1, a needle bearing 185 for rotatably supporting spool 170 to allow the relative rotation between said spool 170 and flange 180. In the inner circumference of second cavity 184, spline teeth are formed to engage with spline teeth 113 formed on the outer circumference of the distal end of first steering shaft 110.

On the other end of flange 180, a cavity 188 is formed for accepting a ring-shaped Circular Spline 132 of the Strain Wave Gearing Speed Reducer to be discussed later. Circular Spline 132 is affixed to cavity 188 by means of a key (not shown).

As shown in FIG. 1, spool 170 is assembled on the outer circumference of first steering shaft 110 concentrically in such a way that the spline teeth 111 formed on the outer circumference of a barrel portion of first steering gear shaft 110, which is not housed in steering gearbox 11, engage with the spline teeth 171 formed on the inner circumference of an end of spool 170.

A small diameter portion 112 having a diameter smaller than the inner diameter of spool 170 is formed in the portion of first steering shaft 110 housed in spool 170 as shown in FIG. 1. It is so constituted that a minute torsion will be generated in this small diameter portion 112 due to the engagement of the spline teeth formed on the end of first steering shaft 110 when flange 180 rotates.

On the other hand, as shown in FIG. 1, spool 170 engages with first steering shaft 110 by means of spline teeth 111 located on first steering shaft 110 on the steering wheel 300 side relative to small diameter portion 112. Consequently, the torsion generated in small diameter portion 112 can be actualized as a rotational displacement between flange 180 and a spool 170.

Motor vehicle steering device 1 of this embodiment, as shown in FIG. 1, has a torque sensor 215 that contains both a resolver for measuring the rotational position of flange 180 and a resolver for measuring the rotational position of the spool on the inner circumference of shaft housing 210. Torque sensor 215 measures the amount of torsion generated in small diameter 112 comparing the measurement results of two resolvers, base on which the rotational torque value applied on first steering shaft 110 is calculated. Torque sensor 215 provides the rotational position of spool 170 as the steering angle of steering wheel 300 in addition to the rotational torque.

Gear housing 220 houses, as shown in FIG. 1, the entirety of second steering shaft 120 that is opposing to first steering shaft 110 coaxially and a portion of turning rod 190 that is substantially perpendicular to said second steering shaft 120. It is also constituted in such a way that the rotary motion of second steering shaft 120 can be converted into the axial linear motion of turning rod 190 by causing a pinion gear 125 formed on the outer circumference of second steering shaft 120 to engage with rack 195 formed on the outer circumference of turning rod 190.

Second steering shaft 120 is, as shown in FIG. 1, rotatably supported by bearings 212 and 213 provided on the inner circumference of gear housing 220. At its end of first steering shaft 110 side, a jointing part 127 having a cavity 128 is provided for fitting a ring-shaped retaining ring 138, which will be described later. Retaining ring 138 is affixed to cavity 128 by means of a key (not shown).

Second steering shaft 120 has a hollow through-hole structure. A bearing 122 is provided on the inner circumference of second steering shaft 120 in order to support rotably said motor shaft 152.

Motor shaft 152 rotates as it is driven by drive motor 150, which is affixed to gear housing 220, as shown in FIG. 1. It is so constituted that the rotation of output shaft 151 of drive motor 150 is transmitted to motor shaft 152 via a drive gear 223 attached to output shaft 151 of drive motor 150 and a driven gear 224 attached to the end of motor shaft 152 opposite to Strain Wave Gearing Speed Reducer 130.

Drive motor 150 is affixed to the inside of gear housing 220 as it is housed in a motor case 156. A motor stator 153 is affixed to the inner circumference of substantially cylindrical motor case 156. A rotor 154 with an output shaft 151 that penetrates through it is rotatably supported in the inside of stator 153.

Motor shaft 152 is, as shown in FIG. 1, rotatably supported by bearing 122 provided inside hollow through structure second steering shaft 120 and bearing 211 provided on the inner circumference of gear housing 220. The end of motor shaft 152 on the side of Strain Wave Gearing Speed Reducer 130 is press-fitted in a through-hole 351 of a cam 131 of Strain Wave Gearing Speed Reducer 130 and is affixed by means of a key 350 (FIG. 4).

Strain Wave Gearing Speed Reducer 130 is placed in a space formed between a cavity 188 of said flange 180 and a cavity 128 of jointing part 127 of second steering shaft 120, which are placed facing each other.

Figure 4:
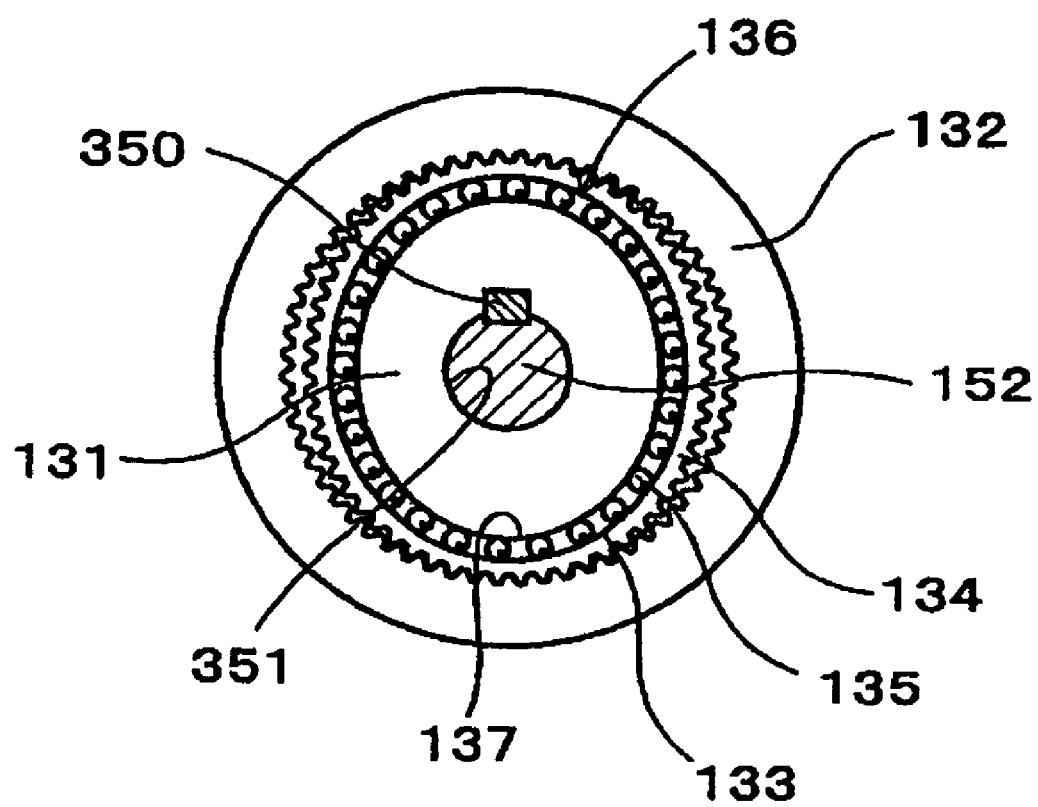
FIG. 4 is a front view of a Strain Wave Gearing Speed Reducer of the present invention.

Strain wave gearing speed reducer 130 is a reducer comprising Circular Spline 132, Flexspline 134, and Wave Generator 136 as shown in FIG. 4.

Circular Spline 132 is a ring-shaped solid component and has spline teeth formed on its inner circumference as shown in FIG. 4. In this embodiment, Circular Spline 132, which is inserted into cavity 188 of flange 180 that is connected to fist steering shaft 110, is affixed to Flange 180 with a key (not shown).

Flexspline 134 is a cup-shaped elastic component made of metal as shown in FIG. 4. Spline teeth having a number of tooth, which is two teeth less than that of Circular Spline 132, and a tooth pitch identical to that of Circular Spline 132, are formed on the outer circumference of Flexspline 134 near its open end.

Circular Spline 132 and Flexspline 134 are in mesh with each other through the spline teeth on the inner circumference of Circular Spline 132 and the spline teeth of the outer circumference of Flexspline 134.

In this embodiment, retaining ring 138 with an outer diameter substantially equal to that of Circular Spline 132 is provided coaxially on the outer circumference of Flexspline 134 as shown in FIG. 1. Spline teeth with the same number of teeth and the same tooth pitch as those of the spline teeth of Flexspline 134 are formed on the inner circumference of retaining ring 138. Retaining ring 138 and Flexspline 134 are in mesh with each other through these teeth. Retaining ring 138 fitted in cavity 128 of jointing part 127 of second steering shaft 120 is affixed to second steering shaft 120 by a key (not shown) in this embodiment.

Wave Generator 136 is a component having a ball bearing 135 fitted on the outer circumference of cam 131 having an elliptical shape as shown in FIG. 4. An inner ring 137 of ball bearing 135 affixed on cam 131 is so constituted to rotate together with cam 131. An outer ring 133 of ball bearing 135 is so constituted to elastically deform with the rotation of cam 131.

This Wave Generator 136 is further fitted inside cup-shaped Flexspline 134 as shown in FIG. 4, and the inner circumference of Flexspline 134 where spline teeth are formed is made to contact with outer ring 133 on the outer circumference of Wave Generator 136. Flexspline 134 whose opening part is distorted into an elliptical shape due to the insertion of Wave Generator 136 is constituted to make a gapless contact with outer ring 133.

The outline of the operation of Strain Wave Gearing Speed Reducer 130 thus constituted will now be described. Strain Wave Gearing Speed Reducer 130 is constituted to be able to modify the transmission ratio between Flexspline 134 and Circular Spline 132 by means of the rotation of cam 131 of Wave Generator 136 as shown in FIG. 4.

When cam 131 rotates inside Flexspline 134, the opening of Flexspline 134 elastically deforms in a sequential manner as if the elliptical shape is rotating. The point the engagement between Flexspline 134 and Circular Spline 132 moves around circumferentially due to this elastic deformation of Flexspline 134.

Meanwhile, the spline teeth of Flexsplie 134 and the spline teeth of Circular Spline 132 are formed to have the same teeth pitch but the number of the spline teeth of Circular Spline 132 is two teeth more than the number of spline teeth of Flexspline 134 as mentioned before. As a consequence, as the point of engagement between Flexspline 134 and Circular Spline 132 travels circumferentially for one revolution due to the rotation of cam 131, a relative rotation occurs between Flexspline 134 and Circular Spline 132.

Strain Wave Gearing Speed Reducer 130 changes the transmission ratio between Flexspline 134 and Circular Spline 132 in accordance with the amount of this relative rotation as shown in FIG. 4.

Retaining ring 138 (FIG. 1) that engages with Flexspline 134 has the same tooth pitch and the same number of teeth as those of the spline teeth of Flexspline 134. As a result, no relative rotation occurs between Flexspline 134 and retaining ring 138 when cam 131 rotates.

In other words, variable gear ratio system 10 of this embodiment is so constituted that a relative rotation is generated between retaining ring 138 (FIG. 1) and Circular Spline 132 due to the rotation of cam 131.

Therefore, a relative rotation is generated between second steering shaft 120 that rotates integrally with retaining ring 138 and first steering shaft 110 that rotates integrally with Circular Spline 132 due to the rotation of cam 131 that rotates integrally with motor shaft 152 as shown in FIG. 1.

Consequently, variable gear ratio system 10 can modify the transmission ratio between first steering shaft 110 and second steering shaft 120 by means of the input rotation supplied by drive motor 150.

The method of controlling variable gear ratio system 10 and EPS actuator 60 in motor vehicle steering device 1 thus constituted will now be described using the block diagram of FIG. 3.

As shown in FIG. 3, motor vehicle steering device 1 of this embodiment performs two control processes in parallel, i.e., the control process of EPS actuator 60 with first ECU 601 and the control process of variable gear ratio system 10 with second ECU 101. In other words, motor vehicle steering device 1 has the capability of variably controlling the transmission ratio of variable gear ratio system 10 by means of second ECU 101 and also controlling the assist power of EPS actuator 60 properly by means of first ECU 601 at the same time.

Second ECU 101, which conducts the control process for variable gear ratio system 10, calculates an appropriate transmission ratio between first steering shaft 110 and second steering shaft 120 based on the steering angle signal provided by torque sensor 40 in parallel with the rotational torque value and the vehicle speed signal provided by vehicle speed sensor 70.

Moreover, the motor voltage to be supplied to drive motor 150 will be calculated in order to realize an appropriate transmission ratio by second ECU 101. Second ECU 101 controls the transmission ratio between first steering shaft 110 and second steering shaft 120 by driving drive motor 150 based on the calculated motor voltage.

First ECU 601, which controls the assist force of EPS actuator 60, calculates a proper assist force based on the input of the rotary torque value of first steering shaft 110 provided by torque sensor 40 and the vehicle speed signal provided by vehicle speed sensor 70. Furthermore, first ECU 601 controls EPS actuator 60 so that the assist force is to be appropriate.

According to motor vehicle steering device 1 of this embodiment, the transmission ratio between first steering shaft 110, which is the input rotation shaft, and second steering shaft 120, which is the output rotation shaft of variable gear ratio system 10, can be modified by means of the rotation of output shaft 151 of drive motor 150.

In particular, in variable gear ratio system 10 of this embodiment, drive motor 150 is affixed in order to avoid the effect of the rotations of first steering shaft 110 and second steering shaft 120. Moreover, the rotation of output shaft 151 of drive motor 150 is supplied to Strain Wave Gearing Speed Reducer 130 as an input via motor shaft 152, which is arranged to form a substantially concentric dual structure with second steering shaft 120.

Therefore, drive motor 150 as a whole does not rotate in conjunction of the rotations of the first steering shaft 110 and the second steering shaft 120 in motor vehicle steering device 1 of this embodiment.

Therefore, it is not necessary to connect a spiral flat cable to drive motor 150. Hence, this motor vehicle steering device 1 is a device having a compact, reliable variable gear ratio system 10 that eliminates various problems arising from the spiral flat cable.

This embodiment is the same as the prior embodiment except that a different speed reducer is used for the variable gear ratio system.

Figure 5:
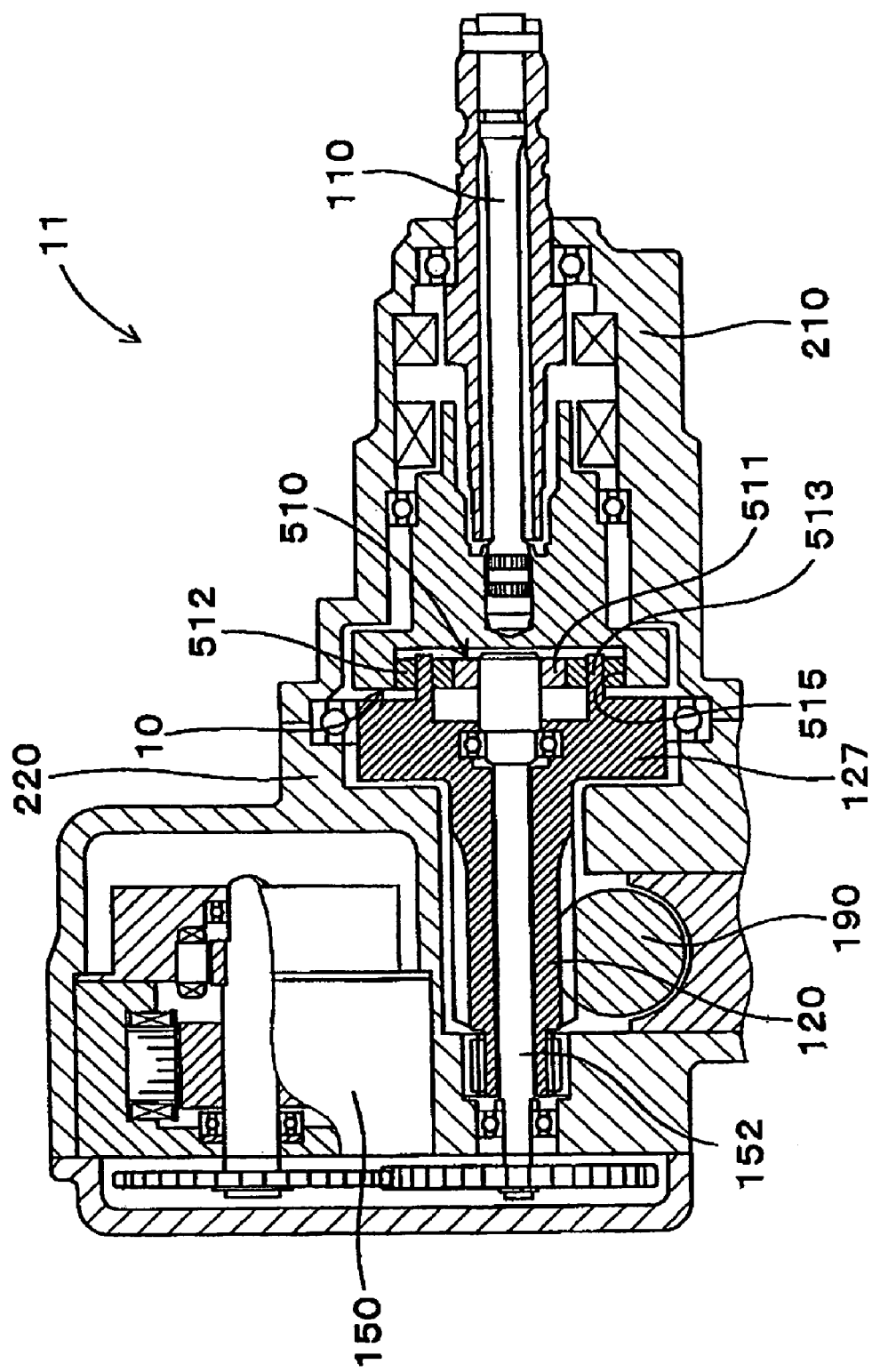
FIG. 5 is a cross section showing a gearbox containing a variable gear ratio system of an embodiment.

Variable gear ratio system 10 of the present embodiment comprises a planetary gear speed reducer 510 as shown in FIG. 5. This planetary gearing reducer 510 comprises a sun gear 511 placed in the center, four planet gears 512 that engage with and revolve around said sun gear 511, and a ring gear 515 that engages with planet gears 512.

Ring gear 515 of this embodiment is formed axially on the inner circumference of cavity 188 of flange 180 that is engaging with first steering shaft 110. Sun gear 511 is affixed to motor shaft 152 by a key (not shown) in addition to press fitting it.

Jointing part 127 of second steering shaft 120 has rotating shafts 513 substantially parallel to the axial direction, so that planet gears 512 can be rotationary supported by four rotating shafts 513.

In this variable gear ratio system 10, the transmission ratio between first steering shaft 110 and second steering shaft 120 can be modified by means of rotating sun gear 511 by rotating drive motor 150.

Other structures and operational effects of this embodiment are similar to those of the previous embodiment.

This embodiment is the same as the previous embodiment except that a different speed reducer is used.

Figure 6:
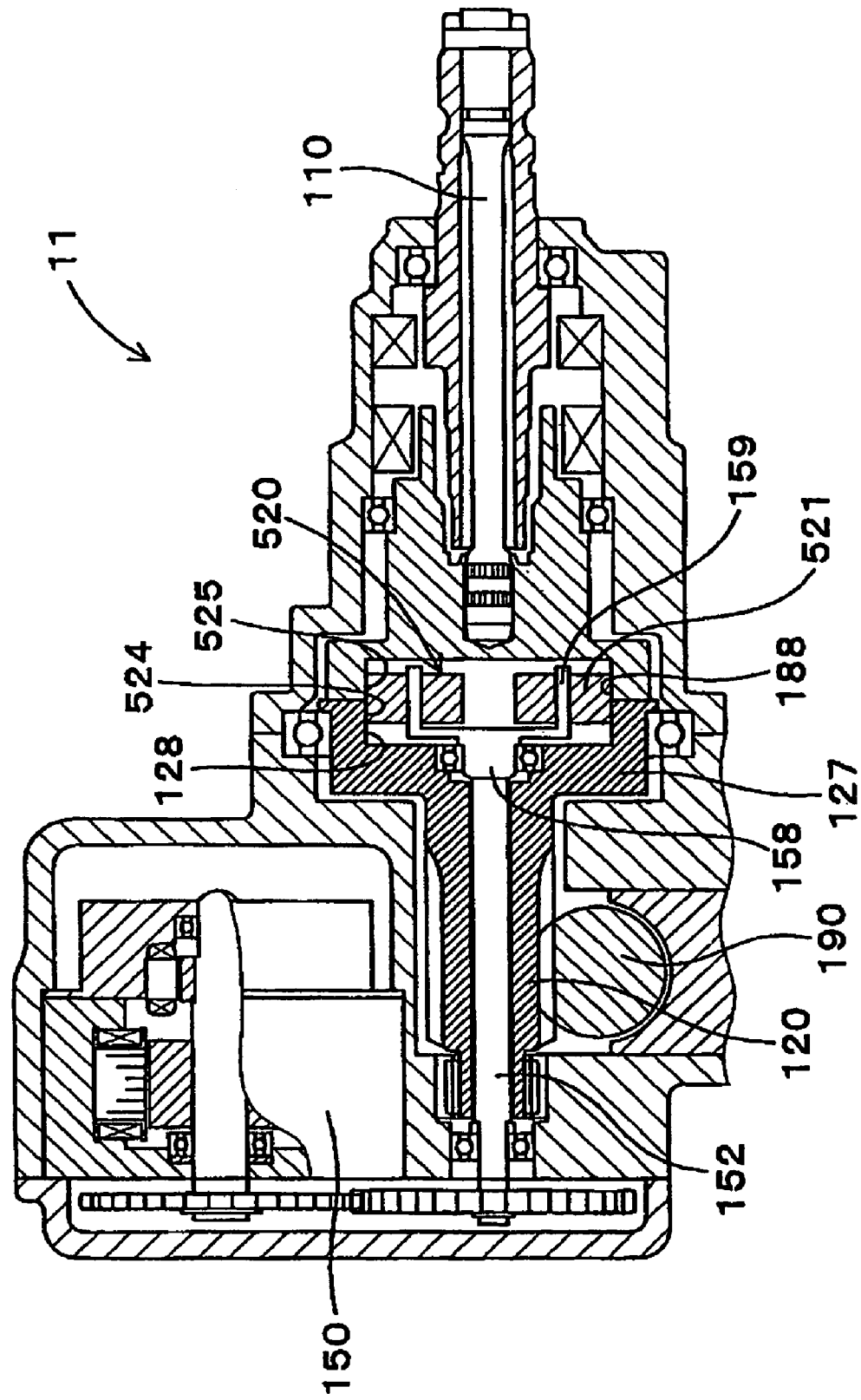
FIG. 6 is a cross section showing a gearbox containing a variable gear ratio system of another embodiment.

Variable gear ratio system 10 of the present embodiment comprises a differential gear speed reducer 520 as shown in FIG. 6. This differential speed reducer 520 is constituted to cause a relative rotation between first steering shaft 110 that rotates integrally with flange 180 and second steering shaft 120 by means of the revolution of four planet gears 521. In this embodiment, the rotation of output shaft 151 of drive motor 150 drives four planet gears 521 to revolve.

A carrier 158 with a diameter larger than the shaft diameter of motor shaft 152 is formed on the differential speed reducer 520 side's end of motor shaft 152, which is connected to output shaft 151 of drive motor 150. Four rotating shafts 159 are provided parallel to the axial direction on carrier 158 at the differential speed reducer 520's side end. Each of these rotating shafts 159 supports a planet gear 521 rotatably.

Each planet gear 521 engages with a first ring gear 525 formed on the inner circumference of cavity 188 of flange 180, and also engages with a second ring gear 524 formed on the inner circumference of cavity 128 of second steering shaft 120. Gear teeth formed on planet gear 521 at the portion that meshes with first ring gear 525 and at the portion that meshes with second ring gear 524 have the same number of teeth.

The number of teeth of first ring gear 525 is two teeth less than the number of teeth of second ring gear 524. In other words, it is so constructed as to generate a relative rotation between first steering shaft 110 connected to flange 180 and second steering shaft 120 by the revolution of planet gears 521 due to the rotation of motor shaft 152.

Therefore, in this variable gear ratio system 10, the transmission ratio between first steering shaft 110 and second steering shaft 120 can be modified by means of revolving planet gears 521 by rotating drive motor 150.

Other structures and operational effects of this embodiment are similar to those of the previous embodiment.

This embodiment is the same as the other embodiments except that the structures of the motor shaft and the second steering shaft are modified.

Figure 7:
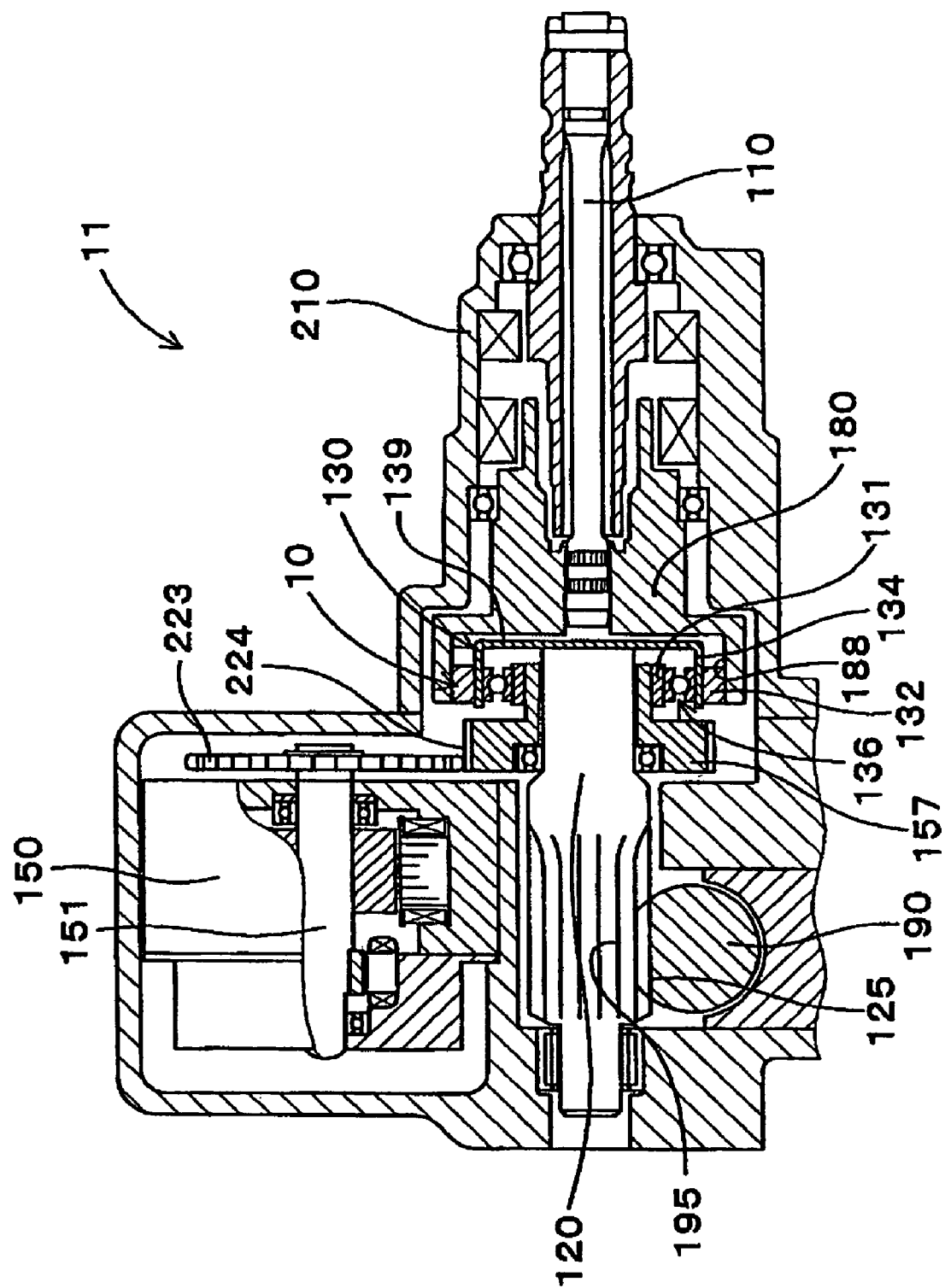
FIG. 7 is a cross section showing a gearbox containing a variable gear ratio system of a further embodiment.

In variable gear ratio system 10 of this embodiment, the second steering shaft 120 is coaxially provided inside the hollow through structure of the motor shaft 152 as shown in FIG. 7.

Motor shaft 152 of this embodiment is of a substantially cylindrical shape and shorter in the axial direction compared to second steering shaft 120. Motor shaft 152 houses the Strain Wave Gearing Speed Reducer 130 side end of second steering shaft 120 that is the end where pinion gear 125 is not formed.

The Strain Wave Gearing Speed Reducer 130 side end of motor shaft 152 is press fitted into a through hole of cam 131 of Strain Wave Gearing Speed Reducer 130, and they are jointed together by a key (not shown). The other end of motor shaft 152 has a gear portion 157, which is larger in diameter compared to the end which is press fitted into cam 131. Formed on the outer circumferential surface of gear portion 157 is a driven gear 224 that engages with a drive gear 223 attached to output shaft 151 of drive motor 150.

Second steering shaft 120 is housed in the inside of motor shaft 152 and protrudes from the end of motor shaft 152 toward first steering shaft 110. The end of second steering shaft 120 is jointed with a diaphragm 139, which is the bottom of cup-like Flexspline 134 so that second steering shaft 120 and Flexspline 134 rotate together.

Other structures and operational effects of this embodiment are similar to those of the other embodiment.

This embodiment is similar to the other embodiments except that said EPS actuator is modified to a hydraulic type and the layout of said drive motor is modified.

Figure 8:
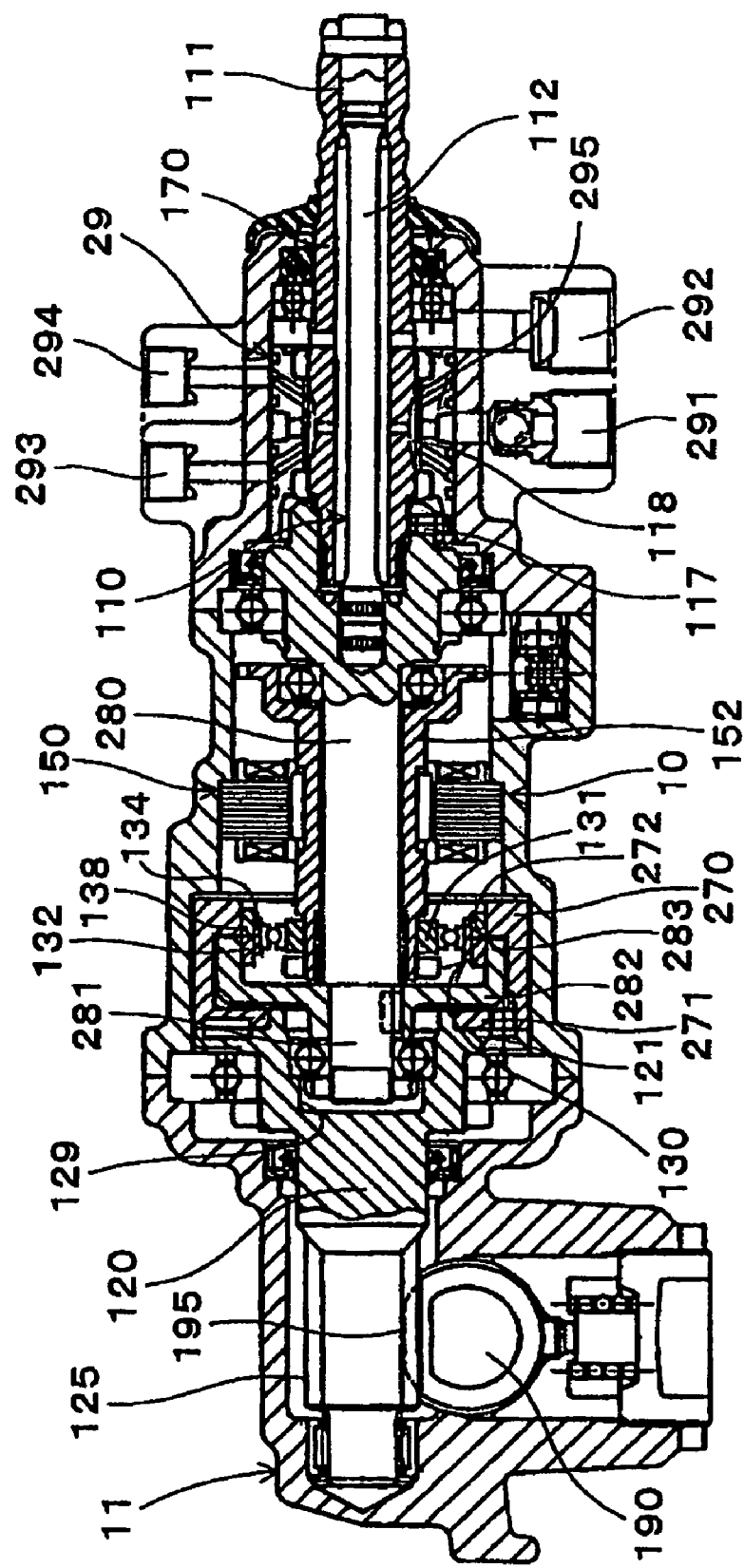
FIG. 8 is a cross section showing a gearbox containing a variable gear ratio system of another embodiment.
Figure 9:
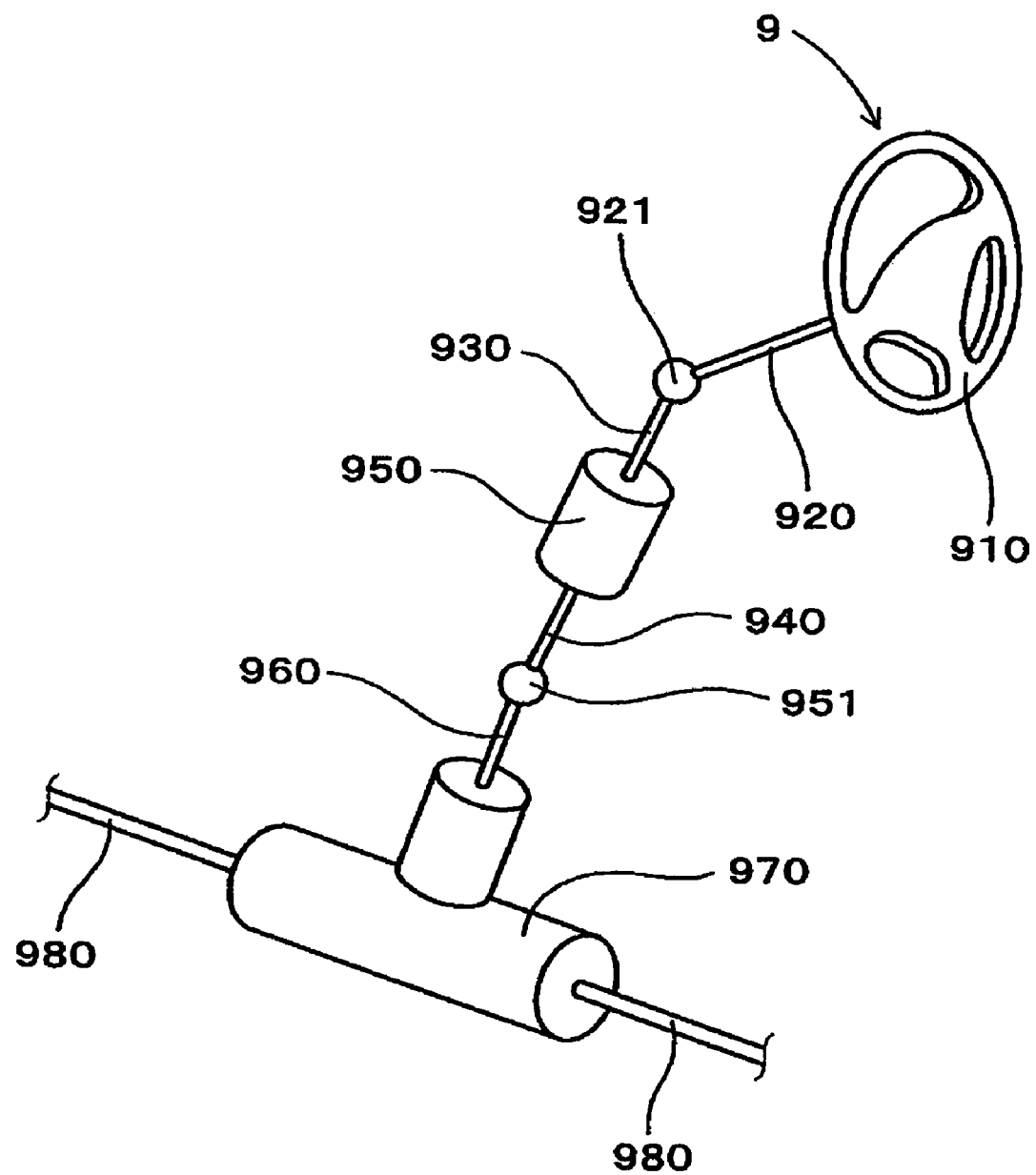
FIG. 9 is a descriptive drawing showing the structure of a motor vehicle steering device of the prior art.
Figure 10:
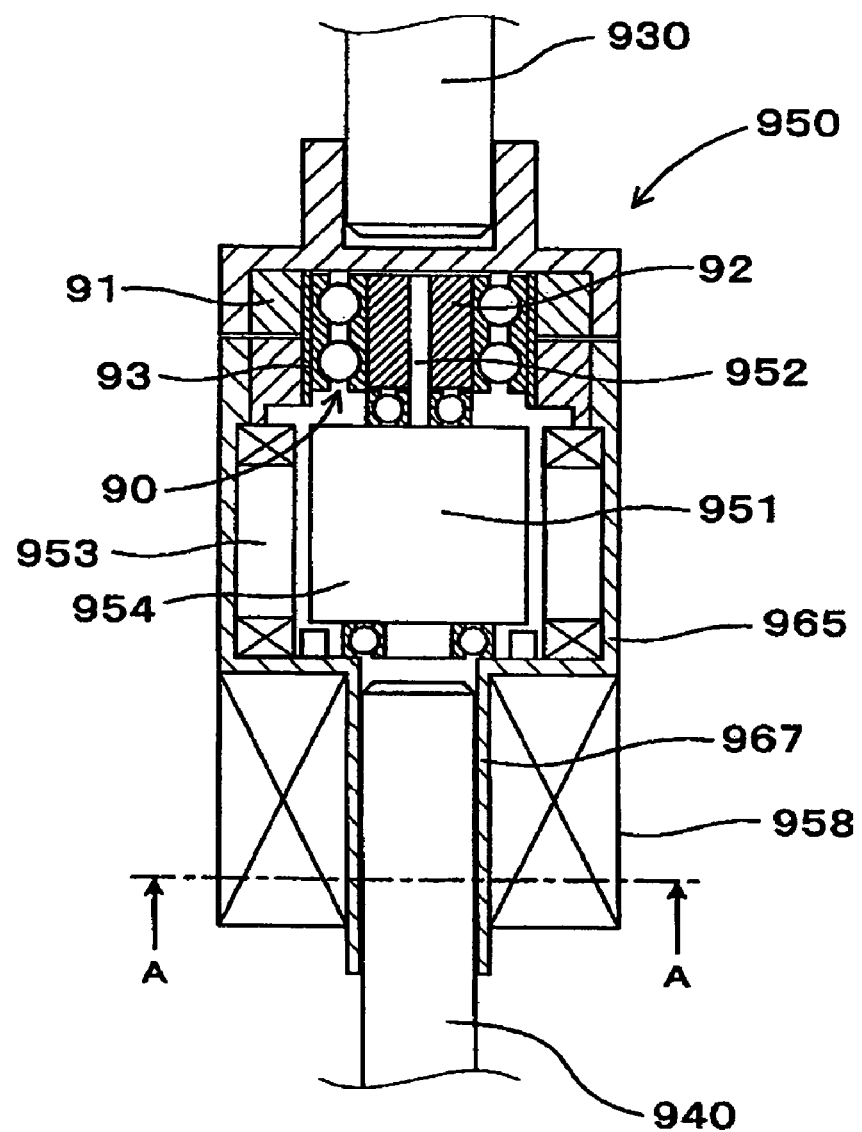
FIG. 10 is a cross sectional view of a variable gear ratio system of the prior art.
Figure 11:
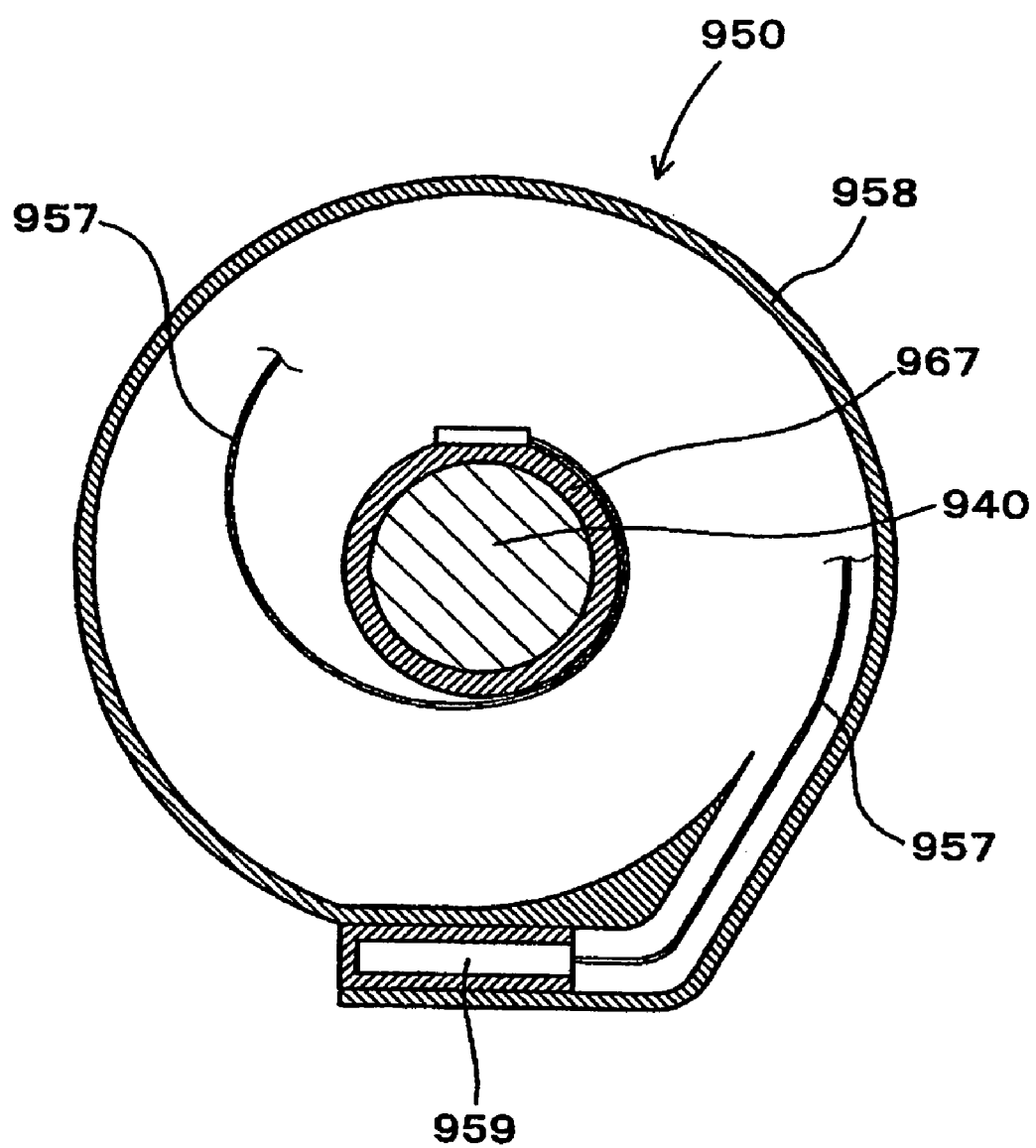
FIG. 11 is a cross sectional view along line 11-11 of FIG. 10 showing a flat cable enclosed in the inside of a cover of the prior art.

In steering gearbox 11 of this embodiment, as shown in FIG. 8 variable gear ratio system 10 is assembled between second steering shaft 120 and a servo valve 29 for the hydraulic control.

In this embodiment, variable gear ratio system 10 is constituted using Strain Wave Gearing Speed Reducer 130 using a transmission shaft 280, which is a part of first steering shaft 110, and motor shaft 152, which is the output shaft of drive motor 150, are used as the rotation input shafts and second steering shaft 120 is used as the rotation output shaft.

Motor shaft 152 is arranged coaxially on the outer circumference side of transmission shaft 280. Therefore, motor shaft 152 and transmission shaft 280 present a coaxially arranged dual structure.

In Strain Wave Gearing Speed Reducer 130 of this embodiment, as shown in FIG. 8, the arrangement of Circular Spline 132 extrapolating from Flexspline 134 and retaining ring 138 is reversed from the first embodiment.

In other words, Circular Spline 132 that rotates together with first steering shaft 110 is placed on side of turning rod 190, and retaining ring 138 that rotates together with second steering shaft 120 is placed on the side of first steering shaft 110.

Said motor shaft 152 is inserted into cam 131 of Wave Generator 136 of Strain Wave Gearing Speed Reducer 130 and is locked by a key.

Said transmission shaft 280 inserted into motor shaft 152 has a protruding end 281 that protrudes toward the side of turning rod 190 from the end of motor shaft 152. A transmitting member 282 is keyed to the outer circumference of this protruding part 281.

This transmitting member 282 has a cylindrical part 283 that extends toward Strain Wave Gearing Speed Reducer 130. A Circular Spline 132 of Strain Wave Gearing Speed Reducer 130 is spline-connected to the inner circumference of cylindrical part 283 where spline teeth are formed.

The end of said second steering shaft 120 on the Strain Wave Gearing Speed Reducer 130 side has a cavity 129 is formed so that protruding part 281 of transmission shaft 280 can be housed. Transmission shaft 280 can be rotatably supported via a bearing provided on the inner circumference of cavity 129.

Flange 121, whose diameter is larger than that of cylindrical part 283 of said transmitting member 282, is formed on the end of second steering shaft 120 on the side of cavity 129. Transmitting member 270 having a substantially cylindrical shape that contains a flange part 271, which forms a joint surface with said flange 121, is bolted onto flange 121.

An inner circumference spline teeth 272 that engages with the spline teeth formed on the outer circumference of said retaining ring 138 is formed on the inner circumference of this transmitting member 270 at the end opposite to flange 271.

In steering gearbox 11 of the motor vehicle steering device of this embodiment, a servo valve 29 for the hydraulic control is provided in place of said torque sensor used in the first embodiment.

First steering shaft 110 of this embodiment has a small diameter portion 112 to serve as a torsion bar section as shown in FIG. 8, and the distal end of said small diameter portion 112 is spline jointed to transmitting shaft part 280.

It is so constituted that a small amount of torsion is applied to this small diameter portion 112 when the rotating power is to be transmitted to transmission shaft 280.

On the other hand, as shown in FIG. 8, spool 170 engages with first steering shaft 110 by means of spline teeth 111 formed on the steering wheel 300 side relative to small diameter portion 112. As a result, the small amount of torsion applied to small diameter portion 112 is actualized as a relative rotation between spool 170 and transmission shaft part 280.

Moreover, a rotary type servo valve 29 for the hydraulic control is provided using small diameter portion 112 that functions as a torsion bar in first steering shaft 110 of this embodiment.

Servo valve 29 of this embodiment comprises a rotary valve 118 formed on spool 170 and a sleeve valve 295, which is housed rotatably in the gap between said rotary valve 118 and shaft housing 210, and connected to transmission shaft 280 by means of a connecting pin 117. This servo valve 29 forms a rotary type four port throttle switch valve having a supply port 291, a discharge port 292 and a pair of supply/discharge ports 293 and 294.

A pair of supply/discharge ports 293 and 294 is connected to the left/right chambers of the power cylinder (not shown) that assists the operation of turning rod 190.

Thus, in the abovementioned hydraulic type motor vehicle steering device, steering gearbox 111 is compactly constituted by unitizing servo valve 29, variable gear ratio system 10, etc.

A unitized construction of said steering gearbox 11 is realized by a characteristic constitution of having said transmission shaft 280 and said motor shaft 152 combined as a concentric dual structure.

Other structures and operational effects of this embodiment are similar to those of the other embodiments.

In one aspect of the invention, a reducer is preferably a Strain Wave Gearing Speed Reducer. The use of a Strain Wave Gearing Speed Reducer, which is a small unit but provides a high transmission ratio, makes it possible to achieve a compact variable gear ratio system with a wide range of transmission ratio.

It is also preferable that the above speed reducer is a planetary gear speed reducer. A planetary speed reducer provides a high degree of freedom in designing a motor vehicle steering device with varieties of design specifications required on a variable gear ratio system.

It is also preferable that said second steering shaft is provided with a hollow through-hole, and said motor shaft passes through said hollow through-hole. In this case, a rotating member placed further inside a rotating member that rotates together with said second steering shaft can be connected with said motor shaft with a relatively simple structure in said speed reducer.

In particular, in case of a Strain Wave Gearing Speed Reducer that presents a concentric three layer structure comprising a Circular Spline, a Flexspline placed inside said Circular Spline, and a Wave Generator placed inside said Flexspline, the structure that connects a Wave Generator and said motor shaft can be simplified.

It is also preferable that a rack gear is formed on said turning rod and a pinion gear is formed on said second steering shaft, so the rack gear meshes with said pinion gear in a steering gear box, which contains at least portions of said turning rod and said second steering shaft. In this case, the vehicle operation feel can be improved by causing the steering angle of said steering wheel to be transmitted to the turning angle of said turning ring more accurately by the engagement of said rack gear and said pinion.

It is further preferable that said variable gear ratio system containing said drive motor and said reducer is built into said steering gearbox. Thus, it is possible to make said steering device more compact as said steering gearbox and said compact variable gear ratio system are combined as an integral unit. Moreover, it is possible to reduce the effect of the operating sound of said drive motor to the cabin by combining said variable gear ratio system with said steering gearbox, which is normally placed outside of the cabin.

It is also preferable that said output shaft and said motor shaft are connected indirectly via a gear train. In this case, it is not necessary to arrange said drive motor and said motor shaft on the same axis. Thus, it is possible to shorten the axial length of said variable gear ratio system.

It is also possible to place said output shaft and said motor shaft on the same axis so that they can be connected directly.

In another aspect of the invention, it is preferable that said first steering shaft has a transmission shaft for transmitting said first steering shaft's rotating power, and aid first steering shaft's rotating power enters into said reducer via said transmission shaft; and that the transmission shaft and said motor shaft constitute a substantially concentric dual structure. In this case, the coaxial arrangement of said motor shaft and said transmission shaft connected to said speed reducer can be achieved efficiently by arranging them in a dual structure.

It is also preferable that the above speed reducer is a Strain Wave Gearing Speed Reducer. In this case, the use of a Strain Wave Gearing Speed Reducer, which is small and yet provides a high transmission ratio, makes it possible to achieve a compact variable gear ratio system with a wide range of transmission ratio.

It is also preferable that the above speed reducer is a planetary gear speed reducer. A planetary speed reducer provides a high degree of freedom in designing a motor vehicle steering device with varieties of design specifications required on a variable gear ratio system.

It is also preferable that said motor shaft is provided with a hollow through-hole, and said first steering shaft passes through said hollow through-hole. In this case, it is possible to obtain the rotating power of said first steering shaft via the inner circumference of the rotating member placed on the outer circumference of said motor shaft in said speed reducer.

In particular, in a Strain Wave Gearing Speed Reducer having a concentric three layer structure comprising a Circular Spline, a Flexspline placed on the inner circumference of said Circular Spline, and a Wave Generator placed on the inner circumference of said Flexspline, it is easy to form a connecting structure that obtains the rotating power of said first steering shaft via the inner circumference of said motor shaft connected to the Wave Generator, and feeds the rotating power to said Circular Spline.

It is also preferable that a rack gear is formed on said turning rod and a pinion gear is formed on said second steering shaft, and the rack gear meshes with said pinion gear in a steering gear box, which contains at least portions of said turning rod and said second steering shaft. In this case, the vehicle operation feel can be improved by causing the steering angle of said steering wheel to be transmitted to the turning angle of said turning ring more accurately by the engagement of the rack gear and the pinion gear.

It is further preferable that said variable gear ratio system containing said drive motor and said reducer is built into said steering gearbox. Thus, it is possible to make said steering device more compact as said steering gearbox and said compact variable gear ratio system are combined as an integral unit. Moreover, it is possible to reduce the effect of the operating sound of said drive motor to the cabin by combining said variable gear ratio system with said steering gearbox, which is normally placed outside of the cabin.

It is preferable that said motor vehicle steering device having an oil pump for generating hydraulic pressure and a power cylinder for driving said steering rod by means of oil pressure;

And the first steering shaft includes a torsion bar for generating a twist that corresponds to a rotating torque acting on said first steering shaft. Additionally, the steering gear box is equipped with a servo valve constituted to switch a oil passage from said oil pump to said power cylinder in accordance with said torsion bar's twist. In this case, said steering gearbox for said hydraulically operated motor vehicle steering device can be constructed compact and as an integral unit. This integrated steering gearbox also simplifies its integration to the vehicle.

It is also preferable that said output shaft of said drive motor is formed integrally with said output shaft of said drive motor. In this case, it is possible to simplify the structure of said variable gear ratio system as well as reduce the number of components by eliminating the transmission mechanism between said output shaft and said motor shaft by integrating them.

Hence obvious changes may be made in the specific embodiment of the invention described herein, such modifications being within the spirit and scope of the invention claimed, it is indicated that all matter contained herein is intended as an illustrative and not as limiting in scope.

The invention claimed is:

1. A motor vehicle steering device comprising:
a variable transmission ratio mechanism that varies a rotational movement transmission ratio between a first steering shaft that rotates with a steering wheel as a unit and a second steering shaft connected to a turning rod for turning a turning ring, wherein
said variable transmission ratio mechanism comprises:
a drive motor;
a motor shaft for transmitting a rotation of said drive motor's output shaft; and
a speed reducer for modifying the transmission ratio between a rotation input entered by said first steering shaft and a rotation output emitted to said second steering shaft;
said motor shaft and said first steering shaft are a substantially concentric dual structure; and
said drive motor is fixedly installed are unaffected by said rotation of said first steering shaft and said second steering shaft with said output shaft is connected to said motor shaft.

2. A motor vehicle steering device of claim 1, wherein said first steering shaft comprises a transmission shaft for transmitting said first steering shaft's rotating power, and
said first steering shaft's rotating power enters into said reducer via said transmission shaft; and
said transmission shaft and said motor shaft are a substantially concentric dual structure.

3. A motor vehicle steering device of claim 1, wherein said speed reducer is a Strain Wave Gearing Speed Reducer.

4. A motor vehicle steering device of claim 1, wherein said speed reducer is a planetary gearing reducer.

5. A motor vehicle steering device of claim 1, wherein said motor shaft has a hollow through-hole, and said first steering shaft passes through said hollow through-hole.

6. A motor vehicle steering device of claim 1, further comprising:
a rack gear formed on said turning rod whereas a mating pinion gear is formed on said second steering shaft, and
said rack gear meshes with said pinion gear in a steering gear box, which contains at least portions of said turning rod and said second steering shaft.

7. A motor vehicle steering device of claim 6, wherein said variable gear ratio system containing said drive motor and said reducer is built into said steering gear box.

8. A motor vehicle steering device of claim 7, further comprises:
an oil pump for generating hydraulic pressure; and
a power cylinder for driving said turning rod by means of oil pressure;
said first steering shaft comprises a torsion bar for generating a torsion that corresponds to a rotating torque acting on said first steering shaft; and
said steering gear box is equipped with a servo valve constituted to switch a oil passage from said oil pump to said power cylinder in accordance with said torsion bar's torque.

9. A motor vehicle steering device of claim 1, wherein said motor shaft is formed integrally with said output shaft of said drive motor.

* * * * *